United States Patent
Kiguchi et al.

[11] Patent Number: 5,952,129
[45] Date of Patent: Sep. 14, 1999

[54] METHOD OF MAKING A COLOR FILTER

[75] Inventors: Hiroshi Kiguchi; Takao Nishikawa; Tatsuya Shimoda; Masaru Kojima; Sadao Kanbe, all of Suwa, Japan

[73] Assignee: Seiko Epson Corporation, Tokyo, Japan

[21] Appl. No.: 08/721,202

[22] Filed: Sep. 26, 1996

[30] Foreign Application Priority Data

| Sep. 28, 1995 | [JP] | Japan | 7-274679 |
| Apr. 23, 1996 | [JP] | Japan | 8-101751 |
| Jun. 21, 1996 | [JP] | Japan | 8-161279 |
| Jul. 8, 1996 | [JP] | Japan | 8-197020 |

[51] Int. Cl.$^6$ ............. G02B 5/20; G02F 1/1335
[52] U.S. Cl. ................................................. 430/7
[58] Field of Search .............. 430/7, 307, 310; 349/106; 347/106

[56] References Cited

U.S. PATENT DOCUMENTS 5,201,268  4/1993  Yamamoto et al. ............... 101/150

FOREIGN PATENT DOCUMENTS

| 299508-A1 | 1/1989 | European Pat. Off. |
| 520760-A1 | 12/1992 | European Pat. Off. |
| 665449-A1 | 8/1995 | European Pat. Off. |
| A-57-64344 | 4/1982 | Japan |
| 61-245106 | 10/1986 | Japan |
| A-1-217302 | 8/1989 | Japan |
| A-4-331181 | 11/1992 | Japan |
| 5016322 | 1/1993 | Japan |
| A-7-146406 | 6/1995 | Japan |
| WO 95/21400 | 8/1995 | WIPO |

*Primary Examiner*—John A. McPherson
*Attorney, Agent, or Firm*—Oliff & Berridge, PLC

[57] ABSTRACT

A process of making a color filter includes a first step of producing a master having a plurality of ink charging recesses arranged in a given pattern, a second step of charging ink of preselected colors into the ink charging recesses to form an ink layer, a third step of forming a resin layer over the master into which the ink have been charged and a fourth step of separating the ink layer and the resin layer together from the master after these layers have been cured.

31 Claims, 4 Drawing Sheets

METHOD OF MAKING A COLOR FILTER

BACKGROUND OF THE INVENTION

1. Field of the Invention

The invention relates to a method of making a color filter which can be used in a liquid crystal display panel and others.

2. Description of Related Art

A color filter for a liquid crystal display panel and the like are made by methods of dyeing, pigment dispersion, printing, electrodeposition and so on.

In the dyeing method, a water soluble polymer is used as a dyed material. The dyed material is made photosensitive with a photoactive compound added into it. Then it is patterned through a lithography step and is dipped into a coloring liquid to form a colored pattern.

For example, a black matrix, called "BM" hereinafter, is first formed on a substrate of glass. A dyed material is made from a water soluble polymer with a photoactive compound added into it so that it is hard to be resolved when exposed to light. The dyed material is applied to the substrate on which BM is formed. Only part of the dyed material is exposed to light through a mask and developed to leave only a first color area of the dyed material. The dyed material is dipped into a dyeing liquid for dyeing and then made hard to form a first colored layer. Such a process will be repeated three times to form a trichromatic color filter.

The color filter obtained by the dyeing method has a high transmittance and a bright color although inferior in resistance to light and heat and moisture absorption.

The pigment dispersion method has steps of applying a photosensitive resin in which a pigment is dispersed onto a substrate, patterning the applied photosensitive resin to form a monochromatic pattern and repeating the same. While in the dyeing method the material is dyed after patterning, in the pigment dispersion method the precolored photosensitive resin is applied to the substrate. The color filter obtained by the pigment dispersion method has a high resistance although is more or less low in transmittance.

The photosensitive resin raises a large problem in utilization efficiency since at least 70% of the applied resin will be removed and discarded.

The printing method has steps of printing three different color paints in a repeated manner, each of these paints being made of a thermo-cure resin with a pigment dispersed therein, and forming a colored layer by thermo-cure of the resin. The printing method is simple although inferior in flatness.

The electrodeposition method has steps of providing a substrate on which patterned transparent electrodes have been formed and dipping the substrate into an electrodeposition painting liquid containing a pigment, a resin, an electrolyte and others to form a first electrodeposited color. Such a process is repeated three times to form the final substrate, which is finally baked. The electrodeposition method is effective for a striped color pattern since it is superior in flatness although not suitable for use in a mosaic color pattern.

In the viewpoint of the fact that the printing method is defective in accuracy and the electrodeposition method has a disadvantage of the limitation of pattern, the dyeing and pigment-dispersion method have been mainly used. However, each of the dyeing and pigment-dispersion methods requires a lithographic step each time when the area of the first, second or third color is to be formed. This is a large obstruction to the improvement of mass production of color filters.

JP 7-146406 discloses a process of forming an ink reception layer on a glass substrate on which a BM has been formed and dyeing the ink reception layer through an ink-jet system. Such a process can improve the mass production of color filters.

However, the last-mentioned process produces a variability in the concentration of color within the same pixel. Furthermore, the transmittance through a filter area corresponding to each pixel at the central part thereof is different from that of the peripheral part in the same filter area. This produces an unevenness in the color concentration. To avoid such a problem, the prior art forms a larger colored area than the corresponding pixel area to cover an unnecessary area with the BM preformed on the substrate, thereby avoiding the variability in transmittance. This means that the BM is important for avoiding the variability.

The importance of the BM is true of the prior dyeing and pigment-dispersion methods besides the ink-jet system.

The formation of the BM requires a very increased number of steps since it is formed by forming a Cr thin film over the entire substrate surface through sputtering or the like and then etching it to remove unnecessary parts.

The sputtering step may be replaced by such a process of forming the BM from a photoactive compound as described in JP 1-217302. However, in this process the BM is also required.

Recently, there has been proposed a new technique for forming a BM on an array substrate to improve an aperture ratio in a liquid crystal panel. Therefore, a process of making a color filter without BM is desired.

SUMMARY OF THE INVENTION

An object of the invention is to provide a method which can simply make a color filter requiring no BM and also having no variability in transmittance and color.

The method of the invention comprises a first step of producing a master having a plurality of ink charging recesses in a given pattern, a second step of charging ink of a preselected color into the respective ink charging recesses to form an ink layer, a third step of applying a resin over the ink charged master to form a resin layer having a light transmission property and a fourth step of separating the ink and resin layers together from the master after the resin layer has been cured.

Briefly, the invention provides a color filter by forming the ink and resin layers through the master and hardening them to each other to form the color filter. The ink layer formed by charging the ink into each of the recesses in the master will be uniform in thickness and sharp in edge. Thus, a color filter having evenness in color concentration can be provided.

The use of the master is economical since it can be repeatedly used as long as the durability thereof permits. Furthermore, the first step can be omitted when the second and subsequent color filters are to be produced. This reduces the number of steps and the manufacturing cost.

BRIEF DESCRIPTION OF THE DRAWINGS

The invention is described in detail with reference to the following drawings, wherein.

DETAILED DESCRIPTION OF PREFERRED EMBODIMENTS

Figure 1A:
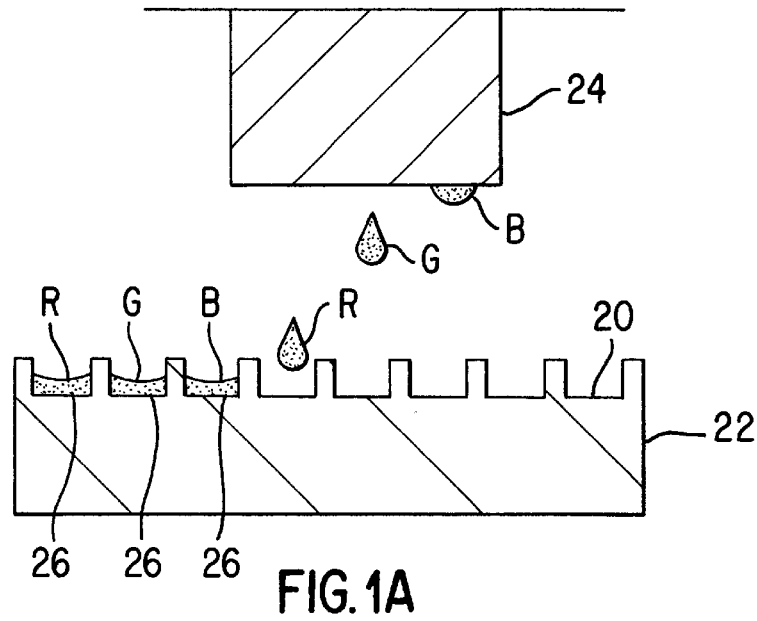
FIGS. 1A to 1C illustrate steps after a master has been formed according to the invention.

The first step of producing a master having a pattern of ink charging recesses may be carried out in the following forms.

(1) A positive-tone resist is applied on the surface of the substrate. The applied resist is then exposed to light and developed through a mask, through which the light can be transmitted onto the area where the ink charging recesses are to be formed. The resist is finally etched to form the ink charging recesses in the substrate, thereby providing the master.

In this step the positive-tone resist is a material in which the exposed part to light can be selectively removed by a liquid developer. When the area in which the ink charging recesses are to be formed is exposed to light, the exposed area can be easily melted. On development, only the resist corresponding to the ink charging recesses can be removed. Thus, the substrate is covered with the resist at an area other than the area in which the ink charging recesses are to be formed. When the surface of such a substrate is etched, the ink charging recesses will be formed. The etching may be of any type including wet-etching, dry-etching and others while a reactive ion etching is superior in control.

The ink charging recesses thus formed by the etching can be precisely and freely controlled with respect to their shape and surface roughness by changing the condition of etching. The ink layer formed by charging the ink into each of the ink charging recesses will be uniform without variability since the shape of the ink charging recesses is truly transferred onto the resin layer.

(2) A negative-tone resist material is applied to the surface of the substrate. When the formed resist material is exposed to light and developed through a mask, the resist corresponding to the ink charging recesses is removed. The resist material is then etched and removed to form the ink charging recesses in the substrate, thereby providing the master.

In this step, the negative resist is a synthetic resin which is less soluble in a liquid developer after being exposed to light. When the area other than the area in which the ink charging recesses are to be formed is exposed to light through the mask, the former area will be less soluble. On the contrary, the area in which the ink charging recesses are to be formed can be easily melted by the liquid developer.

After being developed, the resist in the area other than the area in which the ink charging recesses are to be formed will remain. On the other hand, the resist will be removed in the area in which the ink charging recesses are to be formed. Thus, the substrate is covered with the resist in the area other than the area in which the ink charging recesses are to be formed. The surface of the substrate can be etched to form the ink charging recesses.

(3) A positive-tone resist is applied onto the surface of the substrate. The area in which the ink charging recesses are to be formed is then exposed directly to a laser beam. Thereafter, the substrate is developed and etched to form the ink charging recesses therein, thereby providing the master.

This step does not require a mask, unlike the step (1).

(4) A negative-tone resist is applied onto the surface of the substrate. The area other than the area in which the ink charging recesses are to be formed is then exposed directly to a laser beam. Thereafter, the substrate is developed and etched to form the ink charging recesses therein, thereby providing the master.

This step does not requires a mask, unlike the step (2).

(5) A positive-tone resist is applied onto the surface of the substrate. The area in which the ink charging recesses are to be formed is exposed to light and developed through a mask. The surfaces of the substrate and resist are then made conductive. A metal is electrically deposited onto the conductive surfaces through an electroplating technique to form a metal layer. The metal layer is finally separated from the substrate and resist to form the master.

In this step, the positive resist is a synthetic resin which is soluble in a liquid developer after being exposed to light. When the area other than the area in which the ink charging recesses are to be formed is exposed to light through a mask, the area in which the ink charging recesses are to be formed is less soluble in the liquid developer while the area other than the area in which the ink charging recesses are to be formed can be easily melted by the liquid developer.

When the substrate is developed, the resist in the area other than the area in which the ink charging recesses are to be formed is removed and the resist will remain in the area in which the ink charging recesses are to be formed. The resist thus left becomes convex.

When the substrate and resist are used as a mold and if a metal layer is formed over the surfaces thereof, the master having the ink charging recesses can be made by a convex mold of the resist.

The ink charging recesses are formed by a convex mold of the resist patterned by the lithography. The metal master will be formed by the convex pattern. Such a metal master can be easily released and any failure in transfer can be prevented.

(6) A negative-tone resist is applied onto the surface of the substrate. The substrate is then exposed to light through a mask in the area where the ink charging recesses are to be formed. After being developed, the surface of the substrate and resist are made conductive. A metal is electrically deposited on the conductive surface of the substrate and resist through an electroplating technique to form a metal layer. The metal layer is separated from the substrate and resist to form the master.

In this step, the negative-tone resist is a synthetic resin which is less soluble in a liquid developer after being exposed to light. When the area in which the ink charging recesses are to be formed is exposed to light through the mask, therefore, the resist will be less soluble in the liquid developer. On the other hand, the resist will be maintained to be soluble in the liquid developer.

After the substrate is developed, the area other than the area in which the ink charging recesses are to be formed can be removed while the area in which the ink charging recesses are to be formed can remain. The resist thus left becomes convex.

When the substrate and resist are used as a mold and if the metal layer is formed on the surface of the substrate and resist, the resist can be a convex mold which is in turn used to produce the master having ink charging recesses.

The ink charging recesses are formed with a convex mold made from the resist patterned by the lithography. The metal master will be formed from the convex mold. Such a metal master is superior in release and can prevent any failure in transfer.

(7) A positive-tone resist is applied onto the surface of the substrate. The substrate is then exposed to a laser beam except the area in which the ink charging recesses are to be formed. After being developed, the surface of the substrate and resist are made conductive. A metal is electrically deposited onto the conductive surface of the substrate and resist through an electroplating technique to form a metal layer. The metal layer is separated from the substrate and resist to form the master.

In this step, no mask is required, unlike the step (5).

(8) A negative-tone resist is applied to the surface of the substrate. The substrate is then exposed directly to a laser beam in the area in which the ink charging recesses are to be formed. After being developed, the surface of the substrate and resist are made conductive. A metal is electrically deposited onto the conductive surface of the substrate and resist through an electroplating technique to form a metal layer. The metal layer is separated from the substrate and resist to form the master.

When the substrate itself is to be etched for forming the ink charging recesses, it is preferred that the substrate is a silicon wafer. A technique of etching the silicon wafer has been used in production of semiconductor devices since it can perform a high accuracy machining.

In this step, no mask is required, unlike the step (6).

It is further preferred that a low repellency ink reception layer is formed over each of the ink charging recesses after the first step and before the second step.

When a water ink is used and if a master having a repellent master such as silicon wafer is used, the wafer surface is less wetted by the ink since the surface energy of the ink is smaller than that of the master. Thus, ink droplets given a flight energy by an ink discharge-drive unit of an ink jet device will roll on the master without fixation when they run against the master surface. Thus, the adjacent ink droplets tend to agglomerate together without formation of a desired pattern. Due to the same cause, the ink droplets may fly around to mix with the other color ink droplets when they run against the master surface.

When the low repellency ink reception layer is formed over the ink charging recesses, a pattern can be easily provided while preventing the ink droplets from mixing with the other color ink droplets.

Preferably, the ink reception layer may be formed of any one of ceramics, cellulose derivatives and hydrophilic resins. Suitable cellulose derivatives include, for example, hydroxypropyl cellulose, hydroxyethyl cellulose, methylcellulose or carboxymethyl cellulose.

It is further preferred that in the second step, the ink is charged into the ink charging recesses through an ink jet system. The ink jet system can increase the speed of the ink charging step and will not waste the ink.

In the second step, it is further preferred that the ink is charged into each of the ink charging recesses after a release layer having a low ink adhesive property has been formed over the ink charging recesses. Thus, the product can be more easily removed out of the master. Such a release layer may be any one of nickel and chromium thin films.

Alternatively, the ink to be charged in the second step may contain a release agent.

In the second step, it is further preferred that after the ink has been charged into the respective ink charging recesses, the ink is thermally treated to evaporate the solvent, thereby leaving the pigment. When the resin layer is formed in the third step after the solvent has been evaporated out of the ink, any failure can be prevented when the ink layer is transferred.

It is further preferred that the ink charged in the second step is of a radiation cure type.

It is alternatively preferred that the resin applied in the third step is of a radiation or heat cure type. The resin should have the ability to transmit light.

Particularly, if both the ink and resin are of a radiation or heat cure type, when the resin is applied onto the substrate before the ink is cured and a radiation or heat is applied to both the resin and ink, they are cured at the same time.

If the third step includes a step of placing a light transmission reinforcing sheet on the resin layer, the strength in the resultant color filter may be improved.

Preferred embodiments of the invention are further described below with reference to the drawings.

FIGS. 2A to 2E illustrate steps of producing a master 22 according to the first embodiment of the invention.

Figure 2A:
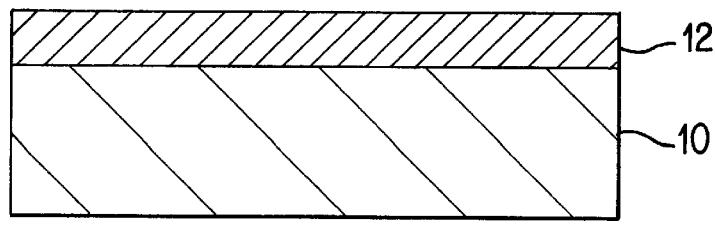
FIGS. 2A to 2E illustrate steps of making a master according to a first embodiment of the invention.

As shown in FIG. 2A, a resist 12 is first applied onto a substrate 10.

The substrate 10 will be etched to make a master 22 and may be a silicon wafer. A technique of etching the silicon wafer has been established, which can perform a highly accurate etching operation. The substrate 10 may be of glass so long as it can be etched.

The resist 12 is of a so called positive type that can be selectively removed by a liquid developer after it has been exposed to light. Positive type resist materials and corresponding liquid developers are well known in the art.

Figure 2B:
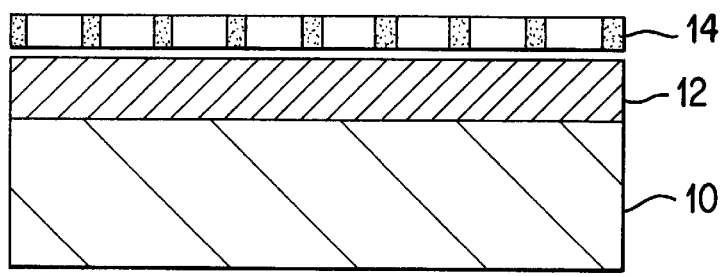

As shown in FIG. 2B, a mask 14 is then placed on the resist 12. Only at its given area, the resist 12 is then exposed to a radiation 16 through the mask 14.

Figure 2C:
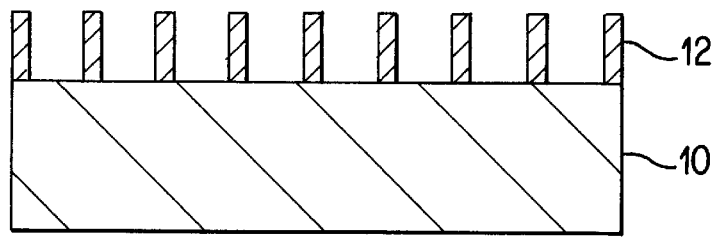
Figure 2D:
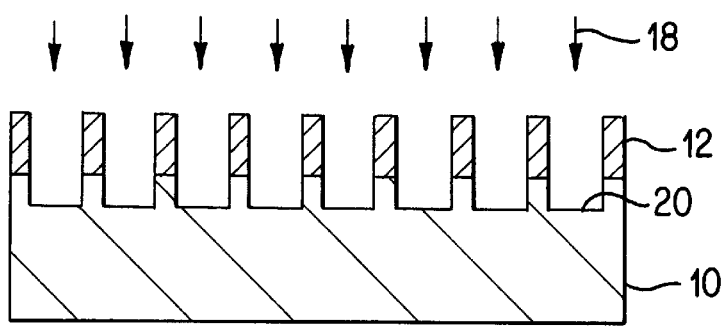
Figure 2E:
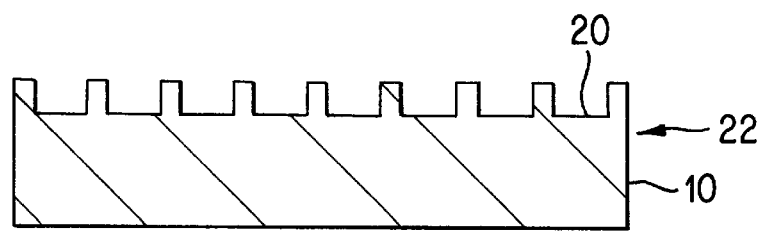

The mask 14 is designed with a pattern permitting the radiation to be radiated onto only an area in which ink charging recesses 20 are formed as shown in FIG. 2E. The ink charging recesses 20 are formed corresponding to the shape or arrangement of each color in a color filter to be produced. A 10-inch-size VGA liquid crystal display panel, for example, has about 900 thousands of pixels or ink charging recesses 20 with a pitch of about 100 $\mu$m and with colors of 640×480×3.

When the exposed substrate is developed by the liquid developer, only the resist material in the area of the ink charging recesses 20 is selectively removed, leaving the resist 12, as shown in FIG. 2C.

After the resist 12 has been patterned in such a manner, the substrate 10 is then subjected to etching, as shown in FIG. 2D. The etching may be of any type including wet-etching, dry-etching and others while a reactive ion etching is superior in control.

If the etching is a reactive ion etching process, for example, the substrate 10 is placed between electrodes. The substrate 10 is etched when free radicals 18 such as, for example, fluorine radicals are attracted to the surface of the substrate 10. In the reactive ion etching operation, the ink charging recesses 20 may be etched into a desirably tapered, roughened or squared shape in accordance with the conditions of etching such as selection of gas, flow rate, gas pressure, bias voltage and others are changed, as well understood in the art.

After the etching has been completed, the resist 12 is removed to form a master 22 from the substrate 10 having the ink charging recesses 20. The remaining resist may be removed by any suitable technique, as well known in the art.

The use of the master 22 is economical since once the master 22 has been formed, it can be used many times as long as the durability thereof permits. The step of making the master 22 can be omitted when the second and subsequent color filters are to be produced. This reduces the number of steps and the manufacturing cost.

Figure 1B:
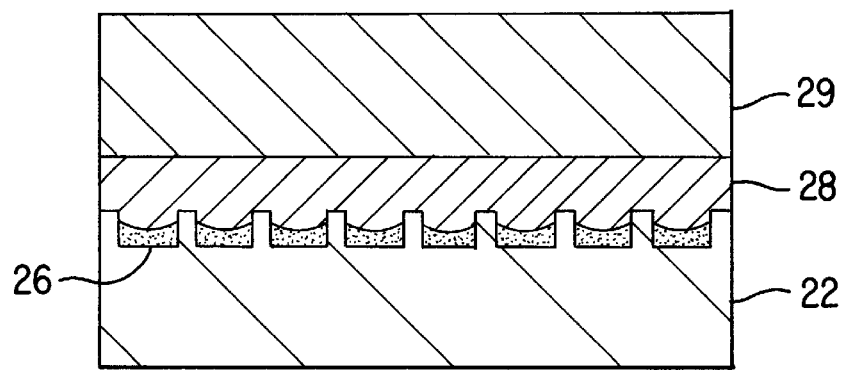
Figure 1C:
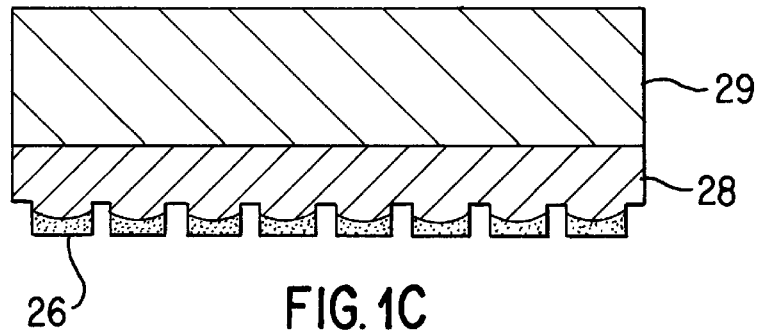

Various steps after the master 22 has been provided are shown in FIGS. 1A to 1C. In FIG. 1A, an ink-jet head 24 is disposed opposite to the ink charging recesses 20 in the master 22. Although for illustration an ink-jet head is shown, any suitable ink discharging device may be used.

The head 24 may be one that has been actually used in the field of ink-jet printers. Such a head 24 can discharge ink droplets corresponding to the pitch in the ink charging recesses 20.

As an illustrative example, if the head 24 includes two rows of ink orifices, each row including five ink orifices, with each ink orifice being adapted to discharge the ink droplets with a drive frequency of 5 kHz, 5000 discharges per second, and when each ink orifice is to discharge three ink droplets into one ink charging recess 20, time required to charge the ink into all the ink charging recesses 20 in the substrate for the 10-inch-size VGA color filter having about 900 thousands of pixels is about 54 seconds=900,000×3 ink droplets/(5000×5×2).

Even if time required to move the head 24 between two adjacent ink charging recesses 20 is considered, time required to charge the ink into all the ink charging recesses 20 may be about two or three minutes.

The pigment dispersion method and other processes required about 10 minutes to form one color through the lithography. Therefore, about 30 minutes is required to make one color filter by such a process. On the contrary, the first embodiment of the invention only requires two to three minutes to charge the ink into all the ink charging recesses 20 and about one to two minutes to perform the subsequent steps from resin application to separation. Therefore, the first embodiment can form a color filter through a shorter time than the prior art.

FIG. 1A illustrates the formation of ink layers 26 by discharging a red-color ink droplet R, a green-color ink droplet G and a blue-color ink droplet B into the respective ink charging recesses 20 through the head 24. The ink may preferably be a radiation cure type containing color materials, although any suitable ink known in the art may be used.

Depending on the material, the adhesive property between the master 22 and the ink and resin layers 26, 28 may be increased. In such a case, the ink layers 26 or the resin layer 28 may be partially torn off when the cured ink and resin layers 26, 28 are to be separated from the master 22. The release agent may be any suitable release agent known in the art.

It is thus preferred that a release agent is previously added into the ink or applied onto the surface of the ink charging recesses 20 in the master 22. Thus, the ink and resin layers 26, 28 can be easily separated from the master 22.

After the ink has been charged into all the ink charging recesses 20 and if the ink contains a solvent, it is thermally treated to evaporate the solvent out of the ink. Such a thermal treatment is preferably carried out at a temperature between 100 and 200° C. for two to five minutes with use of a hot plate or for 20 to 30 minutes with use of a bake furnace. When the solvent is evaporated, the ink layers 26 will shrink. It is therefore required to charge the amount of ink sufficient to secure the necessary color concentration after the shrinkage.

As shown in FIG. 1B, a resin layer 28 is then formed over the respective ink layers 26. A glass substrate 29 is further placed on the resin layer 28.

For example, a resin of a radiation cure type polymer may be applied over the master 22 having ink layers 26 to form the resin layer 28. The glass substrate 29 may be placed on the resin layer 28 to reinforce the substrate. When such an assembly is exposed to radiation, the resin layer 28 will be cured and adhered to the glass substrate 29. Depending on the use of the color filter, the glass substrate 29 may be replaced by a film substrate.

Both the resin and ink layers 28, 26 may be simultaneously exposed to the radiation to cure them at the same time.

When an integrated assembly is formed by the ink layers 26, resin layer 28 and glass substrate 29, such an assembly may be then separated from the master 22 to provide a final color filter as shown in FIG. 1C.

Such a color filter does not have such a BM as in the prior art, but it has a high contrast without color mixture between the adjacent pixels. This is because the shape of each of the ink charging recesses 20 is accurately transferred to the corresponding ink layer 26 to make its thickness uniform.

If necessary, a coating may be formed over the ink layers 26, for example a resin coating. Such a coated color filter may be mounted on another array-substrate after transparent electrodes and an alignment layer been attached thereto.

Although the positive-tone resist 12 is used in the first embodiment, it may be replaced by a negative-tone resist. In such a case, a mask having a pattern inverted from that of the mask 14 will be used. Alternatively, the resist 12 formed on the substrate 10 may be exposed directly to a laser beam without use of the mask.

FIGS. 3A to 3E illustrate various steps of producing a master according to the second embodiment of the invention.

Figure 3A:
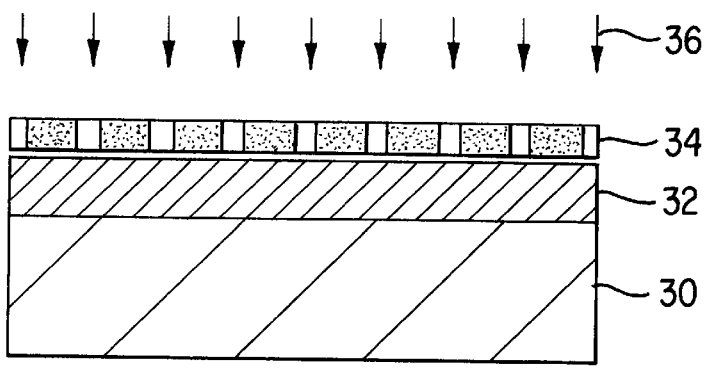
FIGS. 3A to 3E illustrate steps of making a master according to a second embodiment of the invention.
Figure 3B:
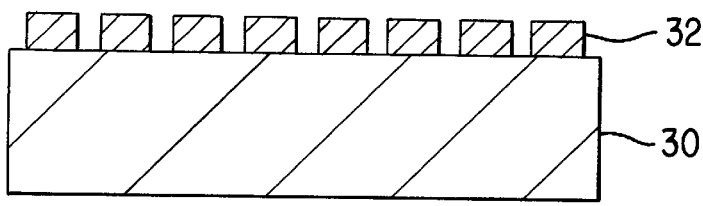

As shown in FIG. 3A, a resist 32 is first applied onto a substrate 30 and a mask 34 is then placed on the resist 32. The resist 32 is then exposed, only at its preselected area, to light through the mask 34.

The resist 32 is the same as in FIGS. 2A to 2E and will not further be described. The mask 34 is different from the mask 14 of FIGS. 2A to 2E only in that the pattern thereof is inverted.

Figure 3C:
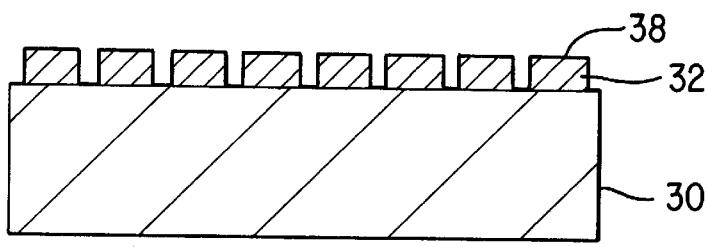
Figure 3D:
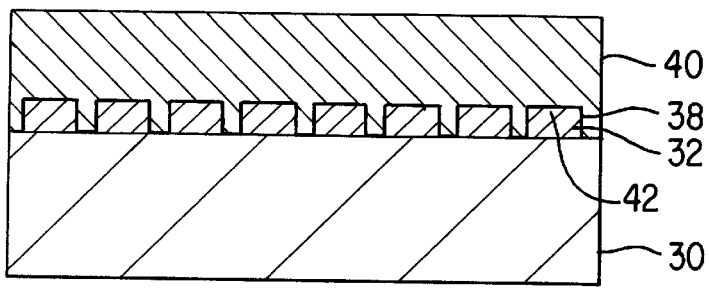
Figure 3E:
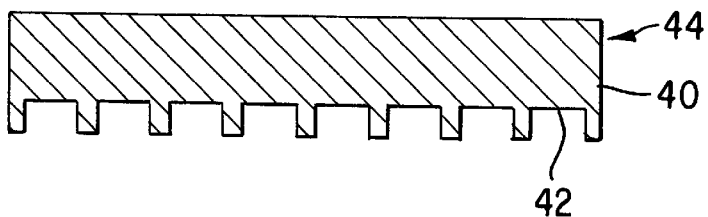

More particularly, the mask 34 is adapted to selectively remove the resist corresponding to an area in which ink charging recesses 42 in FIG. 3E are to be formed. These ink charging recesses 42 are of the same configuration as that of the ink charging recesses 20 shown in FIG. 2E.

After the substrate 30 has been exposed and developed, parts of the resist 32 remain in the form of a convex pattern which is in turn used to form the ink charging recesses 42, as shown in FIG. 3E.

As shown in FIG. 3C, a metal layer 38 is then formed on each of the convex parts of resist 32, for example, by forming a nickel film or the like on the top of the resist 32 through the sputtering technique or any other technique to make it conductive, and electrically depositing another nickel film or the like, on the resist 32 through, for example, the electroplating technique. In such a manner, a master 44 will be formed.

If the metal layer 38 provides less strength, a reinforcing layer 40 may be formed of a resin or any other material over all the resist 32 as shown in FIG. 3D. When the reinforcing layer 40 and the metal layer is separated from the substrate 30 and resist 32, the master 44 may be obtained as shown in FIG. 3E. The master 44 is of the same configuration as that of the master 22 shown in FIG. 2E.

The resulting master 22 is subsequently used in the steps shown in FIGS. 1A to 1C to form a color filter.

In the second embodiment, a positive-tone resist may be replaced by a negative-tone resist. Alternatively the resist formed on the substrate 30 may be directly exposed to a laser beam without use of the mask.

Figure 4A:
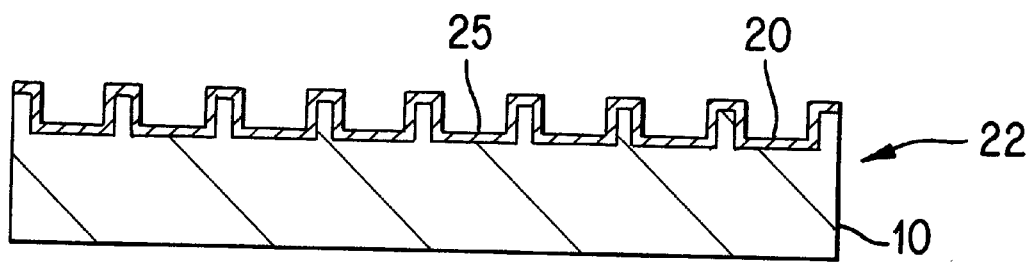
FIGS. 4A to 4B illustrate steps according to a third embodiment of the invention.
Figure 4B:
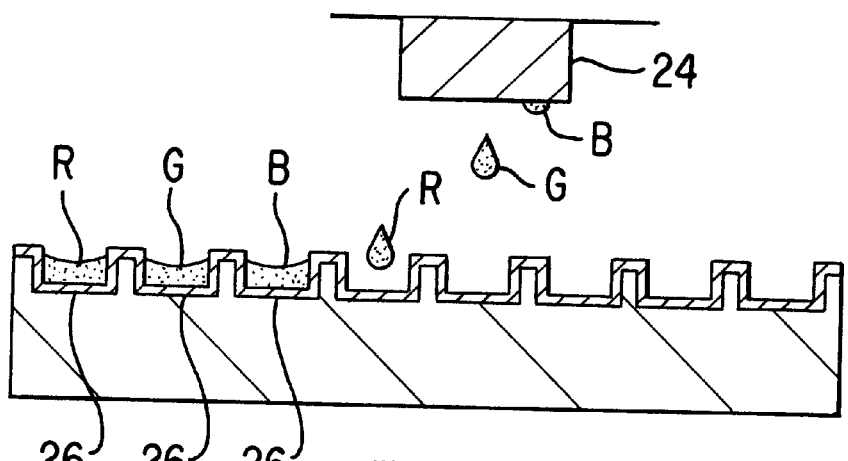

FIGS. 4A and 4B illustrate the third embodiment of the invention.

Like the first embodiment, a substrate 10 is first etched to form a master 22 having ink charging recesses 20. A release layer 25 is then formed on the master 22 to improve the property of release, as shown in FIG. 4A.

The release layer 25 is preferably of metal. The formation of such a release layer 25 may be performed through the sputtering technique, which is highly controllable and economical. However, it is not limited to the sputtering technique, but may be carried out through any one of vacuum deposition, CVD and other suitable techniques. The thickness of the metal layer may be tens to thousands of Angstroms.

The metal material is preferably of nickel or chromium. These metals can be used to form a thin film on the master 22 in an easy and economical manner. In addition, the nickel and chromium have a low adhesive property to ink materials such as pigment and dyes. Particularly, the nickel and chromium have a low adhesive property to acrylate resins which is superior in light transmission.

Ink droplets R, G and B are discharged to form ink layers 26 as shown in FIG. 4B.

Since the release layer 25 has been previously formed on the substrate 10 in the third embodiment, the cured ink and resin layers 26, 28 as shown in FIG. 1B can easily be separated together from the master 22 without failure. This efficiently provides a superior color filter which does not have any color mixture between the adjacent pixels and has an increased contrast. Since a stress on the master 22 is reduced when the ink and resin layers 26, 28 are separated from the master 22, the durability in the master 22 can be economically and greatly improved. Furthermore, the limitation of the master 22, ink layers 26 and resin layer 28 is substantially reduced such that the material to be used can be selected from a broad range of materials.

Figure 5:
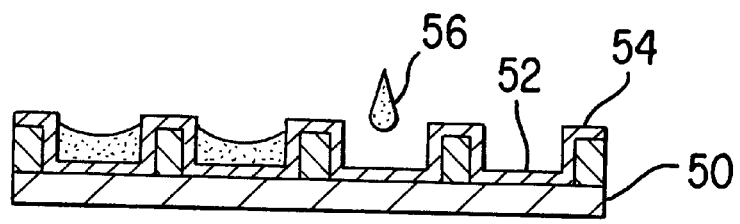
FIG. 5 is a cross-sectional view of a master after an ink reception layer has been formed over the ink charging recesses.

In the third embodiment, it is preferred that an ink reception layer 54 is formed over all the ink charging recesses 52 in the master 50, as shown in FIG. 5. Thus, the ink 56 may be easily wet. The ink reception layer 54 may be separated from a final color filter or from the master 50 together with the color filter.

The experimental results are different from one another depending on whether or not the ink reception layer exists. They will be described below.

Experimental Result 1

A substrate of 4-inch silicon wafer is formed into a master, through a photolithography, by forming several patterns of ink charging recesses of 70 μm in width, 20 mm in length, 1 μm in depth and 210 μm in pitch. Alumina coating agent, GA-8 produced by NISHIMURA GLASS KOGYO, is applied on the master through dipping to form an ink reception layer on the substrate. 20 lines for each color, 70 μm in width, 20 mm in length and 210 μm in pitch, are printed on the substrate through an ink jet printer. The inks are four water pigment inks of cyan, magenta, yellow and black. Another substrate of silicon wafer which is not coated with alumina is provided and similarly printed for a comparison. After printing, these substrates are left for five minutes and heated by a hot plate at 120° C. for ten minutes to evaporate the solvent out of the ink, resulting in agglomerated and cured pigments. The printing results are visually observed to estimate the pattern. The results are shown in the following table.

| Samples | Linearity | Continuity |
| --- | --- | --- |
| Coated | 0 | 0 |
| Non-coated (comparison) | x | x |

The printing results are visually estimated relating to two items, linearity and continuity. The linearity is judged on whether or not the printed lines extend without any curve. The continuity is judged on whether or not the printing line is continuous. The coated substrate shows a good printing result. On the other hand, the non-coated substrate is inferior in the wetting property on the substrate surface. As a result, the ink droplets rolled on the substrate surface and tended to aggregate with adjacent droplets, thereby forming curved and discontinuous lines. It is thus found that the ceramic coated substrate is effectively matched to the water ink to provide an improved quality of print.

Experimental Result 2

A substrate of 4-inch silicon wafer is formed into a master by forming patterns of ink charging recesses, 80 μm in width, 240 μm in length, 10 μm in depth, 90 μm in pattern pitch of width and 250 μm in pattern pitch of length, usable for a color filter having a diagonal size of 2.5-inch through a photolithography. A water solution of hydroxypropyl cellulose (HPC-L, NIHON SODA) is applied to the master through a spin coating technique to form an ink reception layer on the master. The substrate is printed by charging ink into the respective pixels through an ink jet printer. Three kinds of water pigment ink of red, green and blue are used. A master of silicon wafer without ink reception layer is provided for a comparison and similarly printed through the ink jet printer. After printing, these masters are left for five minutes and then heated by the hot plate at 120° C. for ten minutes to evaporate the solvent out of the ink, resulting in agglomerated and cured pigments. The printing results are observed through an optical microscope to estimate them. The results are shown in the following table.

| Samples | Color Mixture/Blur |
| --- | --- |
| Coated | 0 |
| Non-coated (comparison) | x |

The coated master has neither fly to the adjacent pixel nor blur and shows a good printing result. On the other hand, the non-coated substrate has color mixture and blur because ink droplets rolled on or flied over the substrate surface and ink droplets are agglomerated with adjacent ones. The printed pattern of the color filter is not delicate. It is thus found that the substrate coated with the cellulose derivative effectively matches the water ink and provides a good quality of print.

Experimental Result 3

A substrate of acrylic resin is formed into a master by forming several patterns of ink charging recesses, 70 μm in width, 20 mm in length, 5 μm in depth and 210 μm in pitch, through a plasma etching technique. Polyvinyl alcohol, PVA117 of KURARAY, is then applied onto the master through an ink jet printer to draw 20 lines of 70 μm in width, 20 mm in length and 210 μm in pitch on the substrate. The ink is a black pigment water ink. A non-coated master of acrylic resin is provided and similarly printed. After printing, these substrates are left for one day to evaporate the solvent out of the ink, resulting in agglomeration and cure of the pigments. The printing results are visually observed to estimate the pattern. The results are shown in the following table.

| Samples | Linearity | Continuity |
| --- | --- | --- |
| Coated | 0 | 0 |
| Non-coated (comparison) | x | x |

The coated master shows a good printing result. On the other hand, the non-coated master has curved and discontinuous lines resulting from agglomeration of the adjacent ink droplets. This is because ink droplets rolled on the surface of the substrate and are agglomerated with adjacent ink droplets. It is thus found that the substrate is made hydrophilic by the resin coat and effectively matches the water ink, resulting in a good quality of print.

The material to form the ink reception layer may be any well-known material. With consideration of the heat resistance, the material is preferably one of acrylic resins, epoxy resins and imide resins. With further consideration of the absorption of water ink, the material is desirably one of hydroxypropyl cellulose, hydroxyethyl cellulose, methylcellulose, carboxymethyl cellulose and other cellulose derivative. The formation of the ink reception layer may be carried out by any one of spin coating, roll coating, bar coating, spray coating, dip coating and other techniques. The surface graft polymerization method, a known polymerization method, may be used to introduce macromolecule chains. It can be said that the ink-jet process is very effective for forming the ink reception layer applied on the substrate without loss of the material. The formation of the ceramic layer may be carried out by any known thin-film-forming technique such as sol-gel process, electrodeposition or sputtering.

Other Experimental Data

It was experimentally found that the ink layers 26, resin layer 28 and glass substrate 29 could not be separated from the master 22 shown in FIG. 1B to provide a final color filter shown in FIG. 1C if the ink layers 26 do not have films which are hard to some extent. Provision of hard film of ink layers 26 requires a determined temperature.

For example, the minimum temperature required to form films from an emulsion ink 60° C. to 80° C. Acrylic resin ink will be cured at a temperature of 60° C. to 100° C. The maximum heating temperature depends on the heat resistance of the color material. The maximum heating temperature is 300° C. with the color material of a pigment and 120° C. to 200° C. with the color material of a dye.

However, temperature and time depend on the heating method. For example, the method by a hot plate requires 10 to 120 minutes of heating time at 110° C., the method by an oven requires 10 to 120 minutes of heating time at 120° C. and the method by vacuum dryer requires 10 to 120 minutes of heating time at 100° C.

When the ink is charged into the ink charging recesses through the ink jet system, the ink is preferably water-type with a viscosity of 10 or less cps and with a surface tension of about 30 dynes to protect the head. More particularly, the ink is preferably of heat-cure or radiation-cure type.

The heat-cure type ink includes pigment and dye ink. Example compositions are shown in the following tables.

| Color Material | Pigment | 2–20% |
| --- | --- | --- |
| 1) Emulsion Pigment Ink: Heat-Resistance 300° C. | | |
| Hardener | Acryl Emulsion | 1–10% |
| Wetting Agent | Glycerin | 20% |
| Penetrant | Ethanol | 0–3% |
| Solvent | Pure Water | Residue |
| 2) Acrylic Resin Type Dye Ink: Heat-Resistance, 120° C.–200° C. | | |
| Hardener | Acryl Resin | 1–10% |
| Solvent | N-methyl Pyrrolidone | 10% |
| Penetrant | Ethanol | 10% |
| Solvent | Pure Water | Residue |

An example composition of a radiation-cure type pigment ink is shown in the following table.

| Color Material | Pigment | 2–20% |
| --- | --- | --- |
| Hardener | Acryl Resin | 1–10% |
| Light Initiator | Diazo Resin | 0.3% |
| Wetting Agent | Glycerin | 20% |
| Penetrant | Ethanol | 0.3% |
| Solvent | Pure Water | Residue |

Examples of the color materials are shown in the following tables.

| 1) Pigments | |
| --- | --- |
| Red | Perylenes, Anthraquinones, Dianthraquinones, Azos, Diazos, Quinacridones and Anthracenes |
| Green | Halogenated Phthalocyanines and Chromium Oxides |
| Blue | Metal Phthalocyanines, Indanthrones, Indophenols, and Copper Oxides |

Other pigments such as violet, yellow, cyanine and magenta pigments may be used.

| 2) Dyes | |
| --- | --- |
| Red | Basic Dyes, Direct Dyes, Acid Dyes, |
| Green | Basic Lake Dyes, Mordant Dyes, Vat Dyes |
| Blue | and Oil-Soluble Dyes |

The release agents may include quaternary ammonium chloride compounds, alkyl acid phosphate ester compounds, water repellent fluorine compounds and other compounds. When an isopropyl alcohol solution containing 0.01 to 0.2% of any one of these release agents dissolved therein is applied to a substrate through the spin coating or dip coating technique, it is found that the separation could be easily performed. The same result is provided when 0.01 to 0.2% of any one of the aforementioned release agents has been previously added into the ink. Alternatively, a thin film of gold/thiol formed on the master may also provide the same result.

What is claimed is:

1. A method of making a color filter comprising:
   a first step of producing a master having a plurality of ink charging recesses in a given pattern;
   a second step of charging ink of preselected colors into said ink charging recesses through an ink jet system to form an ink layer;
   a third step of applying a resin over said ink charged master to form a resin layer having a light transmission property; and a fourth step of separating said ink layer and said resin layer together from said master after said resin layer has been cured.

2. The method of making a color filter of claim 1, wherein said first step further comprises:
applying a positive-tone resist onto a surface of a substrate;
exposing said resist to light through a mask, said mask having a pattern corresponding to said ink charging recesses;
developing said resist; and
etching said substrate to form said ink charging recesses therein.

3. The method of making a color filter of claim 2, wherein said substrate is a silicon wafer.

4. The method of making a color filter of claim 1, wherein said first step further comprises:
applying a negative-tone resist onto a surface of a substrate;
exposing said resist to light through a mask, said mask having a pattern corresponding to said ink charging recesses;
developing said resist; and
etching said substrate to form said ink charging recesses therein.

5. The method of making a color filter of claim 1, wherein said first step further comprises:
applying a positive-tone resist onto a surface of a substrate;
exposing said resist to a laser beam in an area where said ink charging recesses are to be formed;
developing said substrate; and
etching said substrate to form said ink charging recesses therein.

6. The method of making a color filter of claim 1, wherein said first step further comprises:
applying a negative-tone resist onto a surface of a substrate;
exposing said resist to a laser beam in an area excluding said ink charging recesses;
developing said substrate; and
etching said substrate to form said ink charging recesses therein.

7. The method of making a color filter of claim 1, wherein said first step further comprises:
applying a positive-tone resist onto a surface of a substrate;
exposing said resist to light through a mask, said mask having a pattern corresponding to said ink charging recesses;
developing said resist;
making a patterned surface of said substrate and said resist conductive;
electrically depositing a metal on said patterned surface and forming a metal layer;
separating said metal layer from said substrate and said resist; and
providing said metal layer as said master.

8. The method of making a color filter of claim 1, wherein said first step further comprises:
applying a negative-tone resist onto a surface of a substrate;
exposing said resist to light through a mask, said mask having a pattern corresponding to said ink charging recesses;
developing said resist;
making a patterned surface of said substrate and said resist conductive;
electrically depositing a metal on said patterned surface and forming a metal layer;
separating said metal layer from said substrate and said resist; and
providing said metal layer as said master.

9. The method of making a color filter of claim 1, wherein said first step further comprises:
applying a positive-tone resist onto a surface of a substrate;
exposing said resist to a laser beam in an area where said ink charging recesses are to be formed;
developing said substrate;
making a patterned surface of said substrate and said resist conductive;
electrically depositing a metal on said patterned surface and forming a metal layer;
separating said metal layer from said substrate and said resist; and
providing said metal layer as said master.

10. The method of making a color filter of claim 1, wherein said first step further comprises:
applying a negative-tone resist onto a surface of a substrate;
exposing said resist to a laser beam in an area excluding said ink charging recesses;
developing said substrate;
making a patterned surface of said substrate and said resist conductive;
electrically depositing a metal on said patterned surface and forming a metal layer;
separating said metal layer from said substrate and said resist; and
providing said metal layer as said master.

11. The method of making a color filter of claim 1, further comprising forming a low repellency ink reception layer in said ink charging recesses after said first step and before said second step.

12. The method of making a color filter of claim 11, wherein said ink reception layer is formed of ceramics.

13. The method of making a color filter of claim 11, wherein said ink reception layer is formed of cellulose derivatives.

14. The method of making a color filter of claim 11, wherein said ink reception layer is formed of hydrophilic resins.

15. The method of making a color filter of claim 11, wherein said ink charged in said second step contains a release agent.

16. The method of making a color filter of claim 11, wherein said second step further comprises thermally treating said ink charged in said ink charging recesses and evaporating a solvent of the ink.

17. The method of making a color filter of claim 11, wherein said ink charged in said second step is photosensitive, containing a photoactive compound, and is radiation curable.

18. The method of making a color filter of claim 11, wherein said resin applied in said third step is photosensitive, containing a photoactive compound, and is radiation curable.

19. The method of making a color filter of claim 18, wherein said third step further comprises placing a light transmission reinforcing sheet on said resin layer.

20. The method of making a color filter of claim 18, wherein said third step further comprises placing a light transmission reinforcing sheet on said resin layer.

21. The method of making a color filter of claim 11, wherein said third step further comprises placing a light transmission reinforcing sheet on said resin layer.

22. The method of making a color filter of claim 1, wherein said ink is charged into said ink charging recesses in said second step after a release layer is formed over said ink charging recesses, said release layer having a low ink adhesive property to said ink.

23. The method of making a color filter of claim 22, wherein said second step further comprises thermally treating said ink charged in said ink charging recesses and evaporating a solvent of the ink.

24. The method of making a color filter of claim 1, wherein said ink charged in said second step contains a release agent.

25. The method of making a color filter of claim 24, wherein said second step further comprises thermally treating said ink charged in said ink charging recesses and evaporating a solvent of the ink.

26. The method of making a color filter of claim 1, wherein said second step further comprises thermally treating said ink charged in said ink charging recesses and evaporating a solvent of the ink.

27. The method of making a color filter of claim 1, wherein said ink charged in said second step is photosensitive, containing a photoactive compound, and is radiation curable.

28. The method of making a color filter of claim 1, wherein said resin applied in said third step is photosensitive, containing a photoactive compound, and is radiation curable.

29. The method of making a color filter of claim 28, wherein said third step further comprises placing a light transmission reinforcing sheet on said resin layer.

30. The method of making a color filter of claim 28, wherein said third step further comprises placing a light transmission reinforcing sheet on said resin layer.

31. The method of making a color filter of claim 1, wherein said third step further comprises placing a light transmission reinforcing sheet on said resin layer.

* * * * *